(12) United States Patent
Tsunekane et al.

(10) Patent No.: US 8,223,813 B2
(45) Date of Patent: Jul. 17, 2012

(54) SEMICONDUCTOR LASER PUMPED SOLID-STATE LASER DEVICE

(75) Inventors: Masaki Tsunekane, Okazaki (JP); Takunori Taira, Okazaki (JP)

(73) Assignee: Inter-University Research Institute Corporation, National Institutes of Natural Sciences (JP)

( * ) Notice: Subject to any disclaimer, the term of this patent is extended or adjusted under 35 U.S.C. 154(b) by 0 days.

(21) Appl. No.: 13/004,473

(22) Filed: Jan. 11, 2011

(65) Prior Publication Data

US 2011/0176566 A1 Jul. 21, 2011

(30) Foreign Application Priority Data

Jan. 15, 2010 (JP) ................... 2010-006562

(51) Int. Cl.
*H01S 3/04* (2006.01)
(52) U.S. Cl. ......................................... 372/36
(58) Field of Classification Search .................... 372/36
See application file for complete search history.

(56) References Cited

U.S. PATENT DOCUMENTS 5,553,088 A * 9/1996 Brauch et al. ................. 372/34
6,625,193 B2 * 9/2003 Vetrovec ...................... 372/70

OTHER PUBLICATIONS

A. Giesen et al., "Scalable Concept for Diode-Pumped High-Power Solid-State Lasers", Applied Physics B, vol. 58, pp. 365-372 (1994).
T. Dascalu et al., "90 W continuous-wave diode edge-pumped microchip composite Yb:Y3Al5O12 laser", Applied Physics Letters, vol. 83, No. 20, pp. 4086-4088 (2003).
H. Yagi at al., "Y3Al5O12 ceramic absorbers for the suppression of parasitic oscillation in high-power Nd:YAG lasers", Journal of Luminescense, vol. 121, pp. 88-94 (2006).
Dietmar Kracht et al., "Core-doped Ceramic Nd: YAG Laser with Sm:YAG Cladding", Laser Zentrum Hannover e. V., Hollerithallee 8, D-30419, Hannover, Germany, CThT5.pdf (2007).

* cited by examiner

*Primary Examiner* — Patrick Stafford
(74) *Attorney, Agent, or Firm* — Bacon and Thomas, PLLC

(57) ABSTRACT

A compact semiconductor laser pumped solid-state laser device is provided that can suppress unnecessary parasitic oscillation in a microchip and efficiently extract energy. The semiconductor laser pumped solid-state laser device comprises: a solid-state laser core 1 disposed in the center and formed of a laser medium containing neodymium (Nd) as a laser oscillation element; a light guide region 2 integrally formed around the solid-state laser core 1, having approximately rectangular shape with four linear light entrance windows formed on the outer periphery thereof, and containing samarium (Sm) as a laser oscillation element; and a heat sink 4 disposed on one face of the light guide region 2 including the solid-state core 1, wherein laser oscillation is performed by introducing a pumping light 14 through the light entrance windows 3 and propagating the pumping light 14 through the light guide region 2 to pump the solid-state laser core 1, and wherein a laser oscillation light is extracted from the upper face of the solid-state laser core 1 opposite to the face contacting the heat sink 4.

12 Claims, 7 Drawing Sheets

SEMICONDUCTOR LASER PUMPED SOLID-STATE LASER DEVICE

BACKGROUND OF THE INVENTION

1. Field of the Invention

The present invention relates to a small-sized, high-power, highly efficient, and highly stable microchip solid-state laser device, and particularly to a semiconductor laser pumped solid-state laser device.

2. Description of the Related Art

Conventionally, a semiconductor laser pumped solid-state laser device can absorb optical energy from a plurality of semiconductor lasers into a solid-state laser medium, followed by converting the energy to a highly focusing laser beam having a uniform electromagnetic wavefront in a solid-state laser resonator. Thus, the very high optical density can be obtained by focusing the laser beam using lenses. As such, this type of laser device has been applied to a variety of common devices and systems, such as measuring light sources for physics and chemistry, as well as processing, e.g., cutting and welding, of various industrial materials.

It is known, however, that since the energy difference between a pumping wavelength of the semiconductor laser and an oscillation wavelength of the solid-state laser turns into heat in the solid-state laser medium, the temperature increase due to the heat causes a change of a refractive index in the solid-state laser medium, as well as distortion or deformation resulting from thermal expansion, which prevents the stable laser oscillation at high-power operation.

Thus, as a configuration for efficiently exhausting heat generated in the solid-state laser medium to the outside of a heat sink or the like, so-called disk-type or microchip-type solid-state laser devices have been developed and have shown effects, in which one surface of a thin laser medium is in direct contact with a heat sink. Particularly, the microchip-type devices may utilize a simple optical system for introducing a pumping light from the semiconductor laser into the solid-state laser medium, which is advantageous in terms of the reduction in size and cost (see Patent Documents 1, 2, and Non-Patent Documents 1-4 below).

Patent Document 1: U.S. Pat. No. 5,553,088
Patent Document 2: U.S. Pat. No. 6,625,193
Non-Patent Document 1: A. Giesen et al., "Scalable Concept for Diode-Pumped High-Power Solid-State Lasers", Applied Physics B, Vol. 58, pp. 365-372 (1994)
Non-Patent Document 2: T. Dascalu at al., "90 W continuous-wave diode edge-pumped microchip composite Yb:$Y_3Al_5O_{12}$ Laser", Applied Physics Letters, Vol. 83, No. 20, pp. 4086-4088 (2003)
Non-Patent Document 3: H. Yagi et al., "$Y_3Al_5O_{12}$ ceramic absorbers for the suppression of parasitic oscillation in high-power Nd:YAG lasers", Journal of Luminescence Vol. 121, pp. 88-94 (2006)
Non-Patent Document 4: Dietmar Kracht et al., "Core-doped Ceramic Nd:YAG Laser with Sm:YAG Cladding", Laser Zentrum Hannover, e. V., Hollerithallee 8, D-30419, CThT5 (2007)

Conventionally, in microchip lasers, a pumping light is introduced into a laser medium region (core) provided in the center of the chip through a side face of the chip. A guide region transparent to the pumping light is provided around the core, and the pumping light propagates to the core with total reflection and no loss, and is absorbed therein. By providing an output mirror externally, laser oscillation takes place in the direction perpendicular to the incident direction of the pumping light, i.e., in the thick-wise direction of the chip.

FIG. 1 shows an example of an optical path of parasitic oscillation in a conventional semiconductor laser pumped solid-state laser device.

This figure shows the shape of a typical microchip seen from the optical axis direction of laser oscillation. A circular laser oscillation medium is provided as a center core 101, surrounded by a light guide region 102 for guiding a pumping light 104. A light entrance window 103 for introducing the pumping light 104 is provided on the periphery of the light guide region 102. Since the semiconductor lasers for obtaining high power are usually arrayed with an emitting surface being formed linearly, the light entrance window 103 is also processed into a linear shape for easier entrance of the pumping light. By making the contour of the light guide region 102 into the shape similar to a square, the pumping light 104 can be introduced from as many as four directions. In addition, the end faces of the light entrance window 103 in the thick-wise direction are mirror-polished for introducing the pumping light 104 into the guide region 102 without dispersion.

As shown in FIG. 1, however, there are a number of optical paths (e.g., 105, 106) in the microchip, taken by lights reflected by the faces including the end faces and circulating around. If optical paths pass through the core 101 as the laser oscillation medium having a gain, as with the paths 105 and 106, such a path forms a laser oscillation optical path in the microchip, resulting in the laser oscillation referred to as parasitic oscillation. When the parasitic oscillation occurs within the microchip, pumping energy absorbed in the core circulates around within the microchip as a parasitic oscillation light and turns into heat by being consumed within the microchip, resulting in the substantial decrease in laser output that should to be extracted as a light to the outside of the microchip.

Moreover, as industrial processing lasers, there is a need for high-power, short pulse width, highly stable, and compact semiconductor laser pumped solid-state laser devices.

In view of the circumstances described above, the present invention is directed to provide a compact semiconductor laser pumped solid-state laser device which can suppress undesirable parasitic oscillation in the microchip and efficiently extract energy to the outside.

SUMMARY OF THE INVENTION

In order to achieve the object described above, the present invention provides the following:

[1] A semiconductor laser pumped solid-state laser device, comprising: a solid-state laser core disposed in the center and formed of a laser medium containing neodymium (Nd) as a laser oscillation element; a light guide region integrally formed around the solid-state laser core, having an approximately rectangular shape with four linear light entrance windows formed on the outer periphery thereof, and containing samarium (Sm) as a laser oscillation element; and a heat sink disposed on one face of the light guide region including the solid-state core, wherein laser oscillation is performed by introducing a pumping light through the light entrance window and propagating the pumping light through the light guide region to pump the solid-state laser core, and wherein a laser oscillation light is extracted from the upper face of the solid-state laser core opposite to the face contacting the heat sink.

[2] The semiconductor laser pumped solid-state laser device according to [1], wherein a wavelength of the pumping light is between 750 and 900 nm.

[3] The semiconductor laser pumped solid-state laser device according to [1] or [2], wherein a base material of the solid-state laser core and the light guide region is YAG.

[4] The semiconductor laser pumped solid-state laser device according to any one of [1] to [3], wherein the pumping light is emitted from a pumping semiconductor laser, passes through a microlens for collimating the fast axis direction of the light from the pumping semiconductor laser, a first condenser lens for focusing the light in the slow axis direction, and a second condenser lens for focusing the light in the fast axis direction to enter the light entrance window of the light guide region.

[5] The semiconductor laser pumped solid-state laser device according to any one of [1] to [3], wherein the pumping light is emitted from a plurality of pumping semiconductor lasers stacked in the vertical direction, passes through a plurality of microlenses stacked in the vertical direction for collimating the fast axis direction of the emitted light from the pumping semiconductor lasers, a first condenser lens for focusing the light in the slow axis direction, and a second condenser lens for focusing the light in the fast axis direction to enter the light entrance window of the light guide region.

[6] The semiconductor laser pumped solid-state laser device according to any one of [1] to [3], wherein the pumping semiconductor laser is disposed adjacent to the light entrance window and the pumping light is directly introduced into the light guide region.

[7] The semiconductor laser pumped solid-state laser device according to [1], wherein an optical modulator is directly mounted on a surface of the solid-state laser core and the light guide region opposite to the face contacting the heat sink.

[8] The semiconductor laser pumped solid-state laser device according to [1], wherein the optical modulator is an optical modulator formed of a saturable absorber Cr:YAG.

[9] The semiconductor laser pumped solid-state laser device according to [8], wherein a total reflection film for a laser beam wavelength is formed on the face of the solid-state laser core and the light guide region contacting the heat sink, and a partial reflection film for the laser beam wavelength is formed on the surface of the optical modulator.

[10] The semiconductor laser pumped solid-state laser device according to [8], wherein the surface of the optical modulator opposite to the face contacting the solid-state laser core has a concave shape:

[11] The semiconductor laser pumped solid-state laser device according to [8], wherein the area of the optical modulator is extended to the same area as that of the solid-state laser core and the light guide region.

[12] The semiconductor laser pumped solid-state laser device according to [8], wherein a dielectric layer formed of $SiO_2$ or $Al_2O_3$ is provided between the surface of the solid-state laser core and the light guide region opposite to the face contacting the heat sink and the face of the optical modulator opposite to the solid-state laser core or the light guide region.

According to the present invention, in the semiconductor laser pumped solid-state laser device, the parasitic oscillation in the microchip can be suppressed and the laser beam can be efficiently and stably emitted to the outside. In addition, the high-power and short-pulsed light can be stably generated.

DESCRIPTION OF THE PREFERRED EMBODIMENTS

A semiconductor laser pumped solid-state laser device according to the present invention comprises: a solid-state laser core disposed in the center and formed of a laser medium containing neodymium (Nd) as a laser oscillation element; a light guide region integrally formed around the solid-state laser core, having an approximately rectangular shape with four linear light entrance windows formed on the outer periphery thereof, and containing samarium (Sm) as a laser oscillation element; and a heat sink disposed on one face of the light guide region including the solid-state core, wherein laser oscillation is performed by introducing a pumping light through the light entrance window and propagating the pumping light through the light guide region to pump the solid-state laser core, and wherein a laser oscillation light is extracted from the face of the solid-state laser core opposite to the face contacting the heat sink.

Embodiments

Hereinafter, the embodiments of the present invention will be described in detail.

Figure 1:
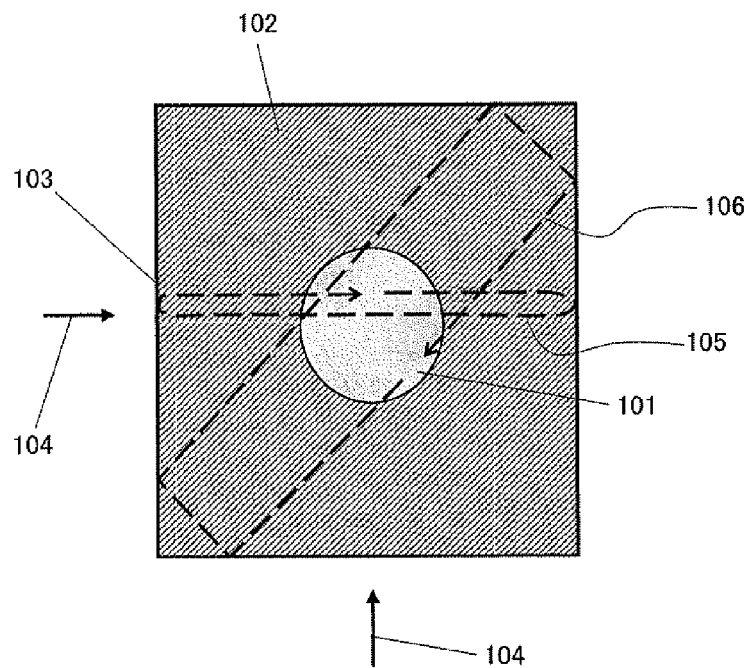
FIG. 1 shows an example of an optical path of parasitic oscillation in a conventional semiconductor laser pumped solid-state laser device.
Figure 2:
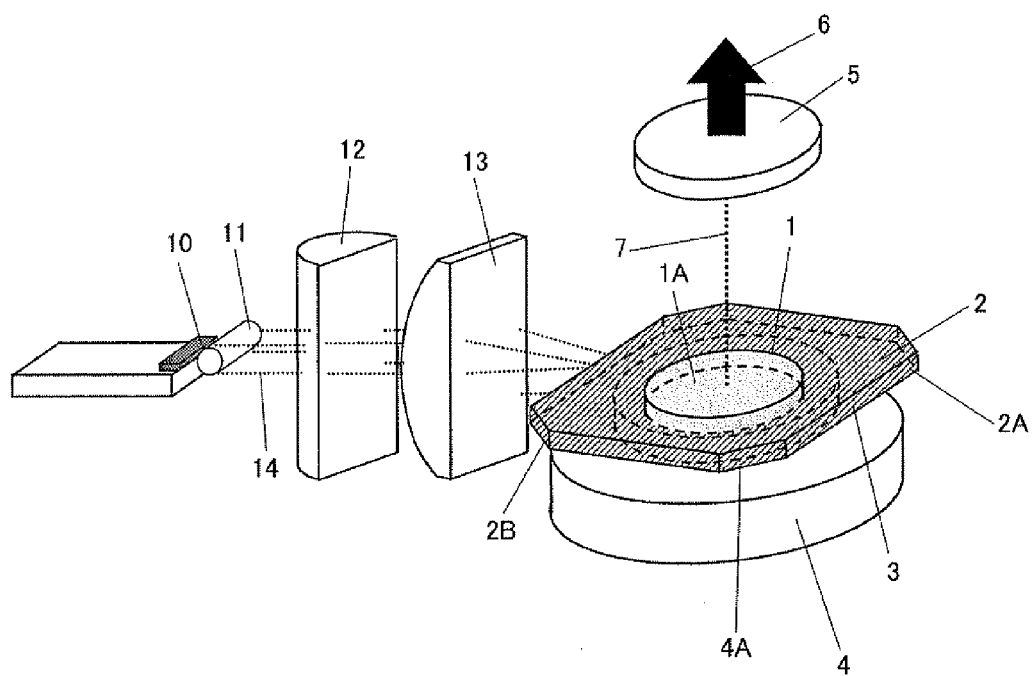
FIG. 2 shows a configuration of a semiconductor laser pumped solid-state laser device according to a first embodiment of the present invention.

FIG. 2 shows a configuration of a semiconductor laser pumped solid-state laser device according to a first embodiment of the present invention.

In this figure, a solid-state laser core 1 is circular-shaped with 2 mm in diameter, formed of a solid-state laser medium (Nd:YAG) containing YAG (yttrium aluminum garnet) as a base material of a microchip and 1 at % of Nd (neodymium) as a laser oscillation element, and fixedly mounted on an upper highly heat conductive section 4A of a heat sink 4 formed of CuW (copper tungsten). On its periphery, a light guide region 2 formed of the same base material, YAG, containing 5 at % of Sm (samarium) is formed, having four linear optical pumping windows 3 formed on an outer peripheral face 2A. Here, in order to allow efficient exhaustion of heat generated in the solid-state laser core 1, it is desirable for the solid-state laser core 1 and the light guide region 2 to be thinned to 1 mm or less. In this embodiment, the thickness thereof is 0.3 mm. In addition, since the solid-state laser core 1 and the light guide region 2 sufficiently adhere to each other without a layer of air therebetween and both are formed of the same base material, YAG, no optical reflection occurs at the interface due to the difference of refractive indexes. A face 1A of the solid-state laser core 1 opposite to the face contacting the heat sink 4 is coated with a non-reflection dielectric coating for a solid-state laser oscillation wavelength 1064 nm (reflectivity <0.2%). An output mirror 5 is a plane mirror made from BK7, and coated with a partial reflection dielectric coating for the solid-state laser oscillation wavelength 1064 nm (reflectivity 90%). A pumping light 14 with a wavelength of 808 nm emitted from a pumping semiconductor laser (LD) 10 is collimated in the fast axis direction by a microlens 11, transmitted through a first condenser lens 12 for focusing in the slow axis direction, and focused on the light entrance window 3 on the outer peripheral face 2A of the light guide region 2 by a second condenser lens 13 for focusing in the fast axis direction. The first condenser lens 12 is used for adjusting the slow axis direction of the pumping light 14 so that the pumping light 14 would not disperse wider than the diameter of the solid-state laser core 1 when the light reaches the solid-state laser core 1. The pumping light 14 entered the light guide region 2 through the light entrance window 3 propagates within the light guide region 2 while repeating total reflection on the upper and lower faces of the light guide region 2, to reach the solid-state laser core 1 and be absorbed in the laser oscillation element, Nd. A resonator is configured between a total reflection film 2B (reflectivity >99.7%) for a laser beam wavelength, preliminarily formed on the face of the solid-state laser core 1 contacting the heat sink 4 and the output mirror 5, so that a laser output 6 is emitted to the outside through the output mirror 5. Here, reference numeral 7 denotes an optical axis of the solid-state laser resonator.

Figure 3:
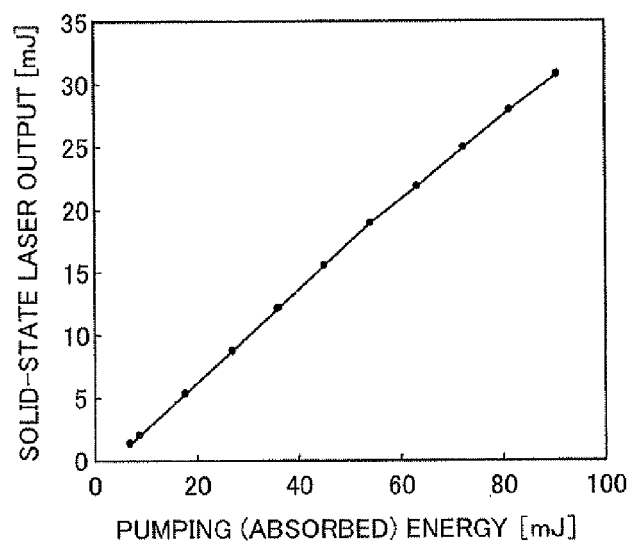
FIG. 3 shows a result of measurement of laser output against absorption energy of the semiconductor laser pumped solid-state laser device according to the first embodiment of the present invention.

FIG. 3 shows a result of measurement of solid-state laser output (mJ) extracted from the output mirror against pumping (absorbed) energy (mJ) of the pumping light from the semiconductor laser absorbed by the solid-state laser core, in the semiconductor laser pumped solid-state laser device according to the first embodiment of the present invention.

When the parasitic oscillation occurs in the solid-state laser medium, such a phenomenon is observed that the efficiency of the solid-state laser output against pumping substantially decreases, or the laser output does not increase even with the increase in the pumping energy, resulting in saturation. However, the solid-state laser device of this embodiment does not exhibit such a phenomenon, revealing that Sm doped in the light guide region can suppress the parasitic oscillation.

Figure 4:
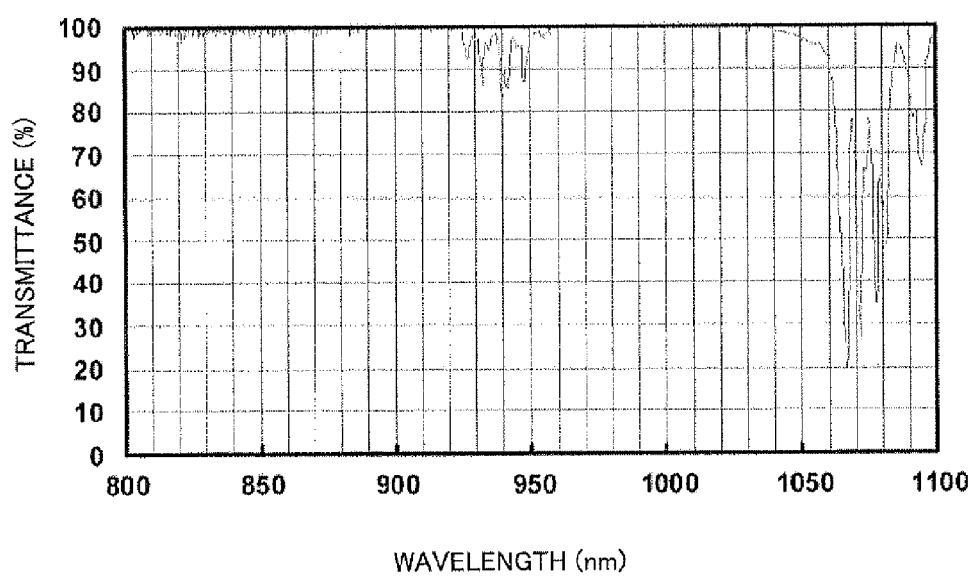
FIG. 4 shows a result of measurement of transmittance against an optical wavelength of Sm-doped YAG medium according to the first embodiment of the present invention.

FIG. 4 shows a result of measurement of transmittance against an optical wavelength of the Sm-doped YAG medium according to the first embodiment of the present invention.

In this figure, there is shown the absorption characteristic of Sm:YAG having 1 mm in thickness formed of YAG, most commonly used as the base material of a high-output laser medium, doped with 5 at % of Sm. It can be found that it has substantial absorption with the transmittance of approximately 50% for 1064 nm which is a representative oscillation wavelength of Nd:YAG formed of YAG doped with Nd as a laser oscillation element, while it is transparent with no absorption for near 808 nm which is a representative pumping wavelength of Nd:YAG. Thus, by using Sm:YAG for the light guide region, the pumping light is not absorbed while only the laser beam of the parasitic oscillation is absorbed, allowing effective suppression of internal parasitic oscillation.

Figure 5:
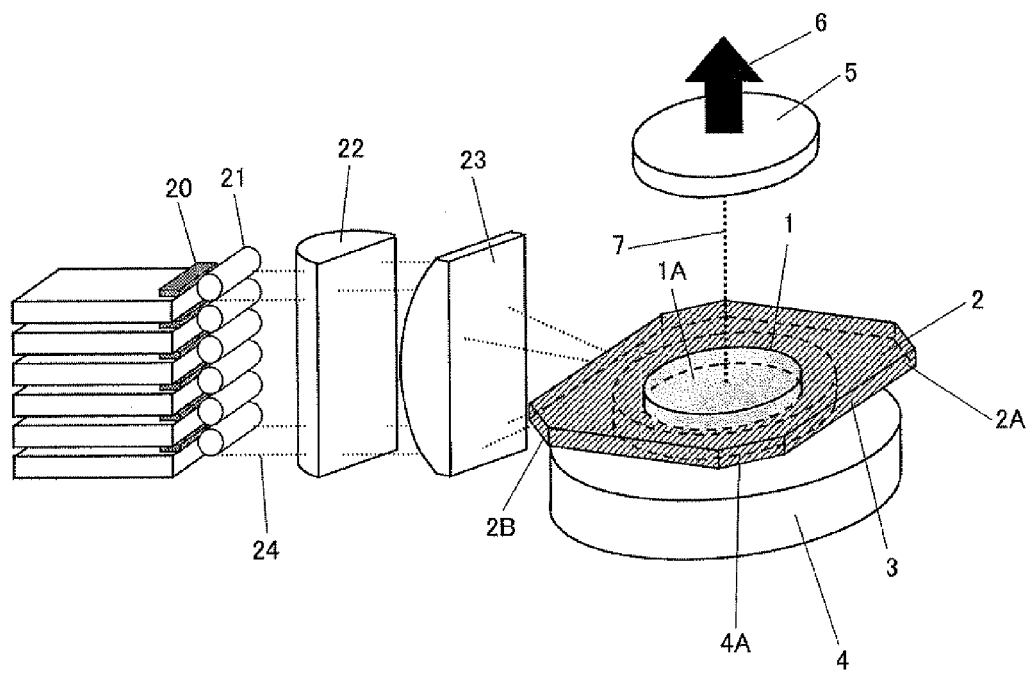
FIG. 5 shows a configuration of the semiconductor laser pumped solid-state laser device according to a second embodiment of the present invention.

FIG. 5 shows a configuration of the semiconductor laser pumped solid-state laser device according to a second embodiment of the present invention.

Although in this embodiment the configuration of a microchip portion is the same as that of the first embodiment described above, a plurality of, in this embodiment six of, pumping semiconductor lasers (LD) 20 and rod lenses 21 for collimation in the fast axis direction are stacked respectively in the vertical direction. Pumping lights 24 emitted from the respective pumping semiconductor lasers 20 are collimated in the fast axis direction by the rod lenses 21, transmitted through a single first condenser lens 22 for focusing in the slow axis direction, and focused on the light entrance window 3 on the outer peripheral face 2A of the light guide region 2 by a single second condenser lens 23 for focusing in the fast axis direction. The first condenser lens 22 is used to adjust the slow axis direction of the pumping lights 24, so that the pumping lights 24 do not disperse wider than the diameter of the solid-state laser core 1 when the light reaches the solid-state laser core 1. Since the stacking interval in the vertical direction of the pumping semiconductor lasers 20 is 2 mm or less and thus the respective beams emitted therefrom are close to each other, the beams can be collectively shaped by a single cylindrical lens 22 and focused by a single cylindrical lens 23. As with the first embodiment, the pumping light 24 entered the light guide region 2 through the light entrance window 3 propagates through the light guide region 2 while repeating total reflection on the upper and lower faces, reaches the solid-state laser core 1, and is absorbed in the laser oscillation element, Nd. Since the incident energy of the pumping light 24 per light entrance window 3 becomes six times greater by stacking six pumping semiconductor lasers 20, the output of the microchip solid-state laser can be significantly increased.

Figure 6:
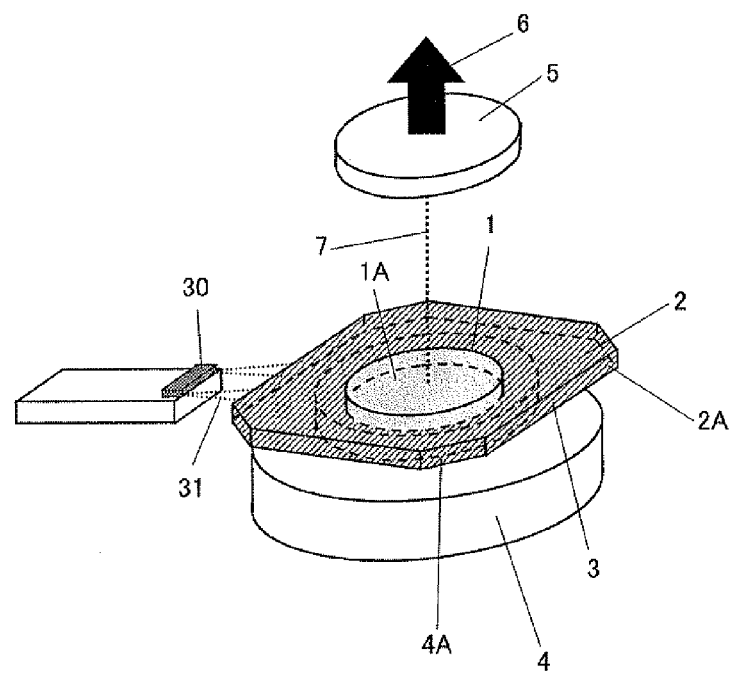
FIG. 6 shows a configuration of the semiconductor laser pumped solid-state laser device according to a third embodiment of the present invention.

FIG. 6 shows a configuration of the semiconductor laser pumped solid-state laser device according to a third embodiment of the present invention.

Although in this embodiment the configuration of a microchip portion is the same as that of the first embodiment described above, a pumping light 31 is introduced directly into the light guide region 2 by placing a pumping semiconductor laser 30 adjacent to the light entrance window 3. With this configuration, the number of parts, such as the collimating lenses and condenser lenses, can be reduced and the cost of the device can be thus reduced as compared to the first embodiment.

Figure 7:
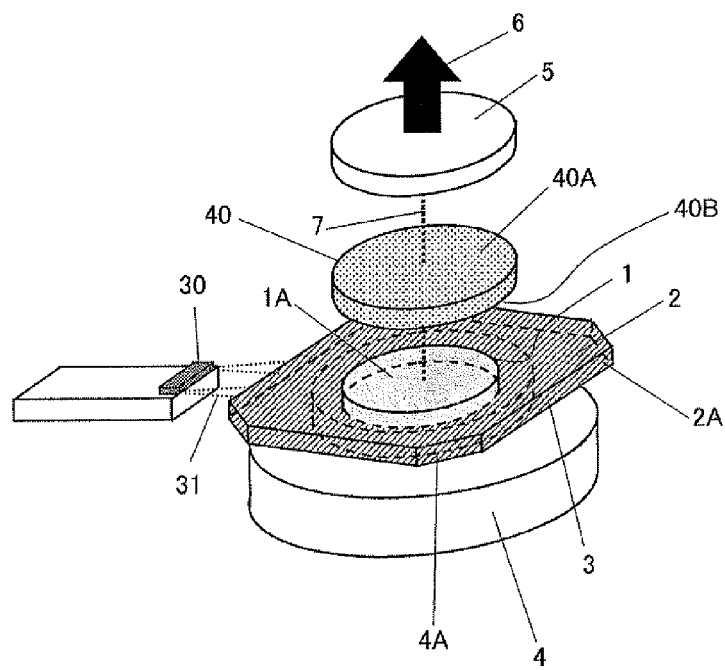
FIG. 7 shows a configuration of the semiconductor laser pumped solid-state laser device according to a fourth embodiment of the present invention.

FIG. 7 shows a configuration of the semiconductor laser pumped solid-state laser device according to a fourth embodiment of the present invention.

Although in this embodiment the configuration of introducing the pumping light 31 from the pumping semiconductor laser 30 is the same as that of the third embodiment described above, an optical modulator 40 is inserted in the optical path 7 of the solid-state laser resonator. In this embodiment, a saturable absorber Cr:YAG is used as the optical modulator 40. Both end faces 40A and 40B of Cr:YAG are coated with a non-reflection coating for the laser oscillation wavelength 1064 nm (reflectivity <0.2%), and their initial transmittance for one pass of Cr:YAG for the laser beam wavelength is 80%. By inserting the saturable absorber Cr:YAG into the solid-state laser resonator, pulses having high optical peak energy can be generated with passive Q-switch operation, so that the device can be utilized for processing of metal or the like.

Figure 8:
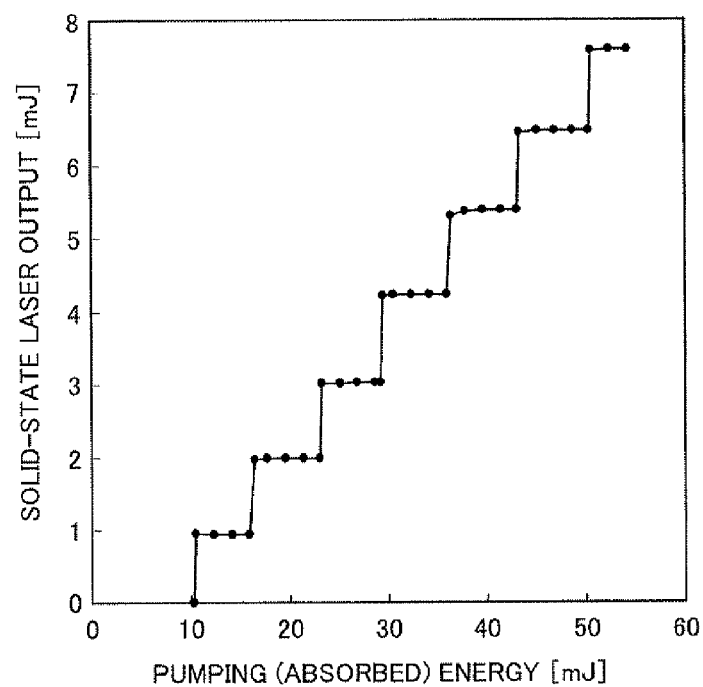
FIG. 8 shows a result of measurement of laser output against absorption energy of the semiconductor laser pumped solid-state laser device according to the fourth embodiment of the present invention.

FIG. 8 shows a result of measurement of solid-state laser output extracted from the output mirror against pumping (absorbed) energy of the pumping light from the semiconductor laser absorbed by the solid-state laser core, in the semiconductor laser pumped solid-laser device according to the fourth embodiment of the present invention. In this figure, the horizontal axis represents the pumping (absorbed) energy (mJ) and the vertical axis represents the solid-state laser output (mJ).

As can be clearly seen in FIG. 8, due to the generation of pulses having a constant interval inherent in the passive Q-switch operation, the step-wise regular output characteristic can be obtained. As with the first embodiment, this embodiment does not exhibit the decrease in efficiency and the saturation of output due to the parasitic oscillation in the laser medium, and the stable operation can be observed.

Figure 9:
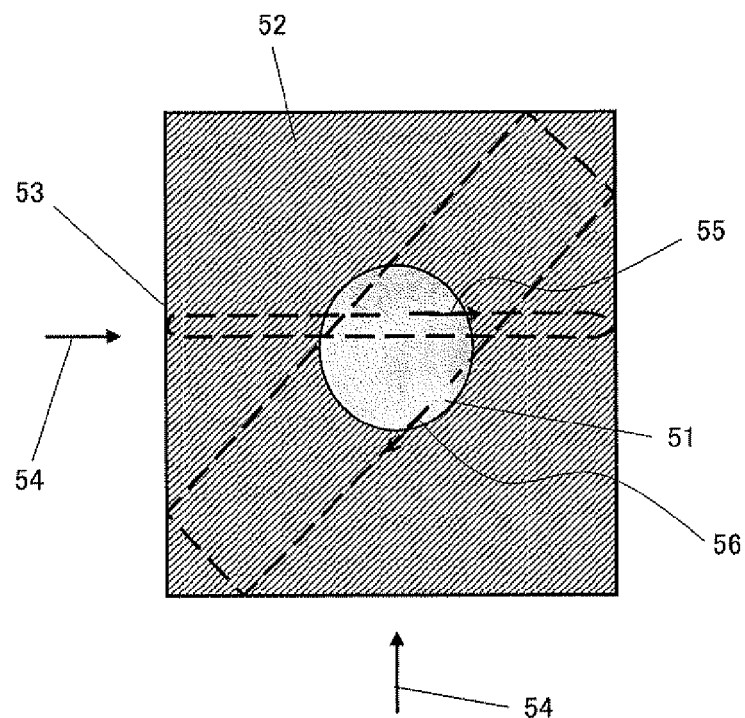
FIG. 9 shows prevention of parasitic oscillation in the semiconductor laser pumped solid-state laser device according to the present invention.

FIG. 9 shows prevention of the parasitic oscillation in the semiconductor laser pumped solid-state laser device according to the present invention.

According to the present invention, as indicated by dashed lines in FIG. 9, regardless of the presence of optical paths 55 and 56 passing through a region of a solid-state laser core 51 and circulating through a light guide region 52, the parasitic oscillation lights 55 and 56 from the solid-state laser core 51 are absorbed in the light guide region 52 to disappear along the way, and thus they do not circulate and cause the parasitic oscillation therein. Thus, the pumping energy absorbed in the solid-state laser core 51 can be efficiently extracted to the outside as the laser output. Here, reference numeral 53 denotes a light entrance window.

Figure 10:
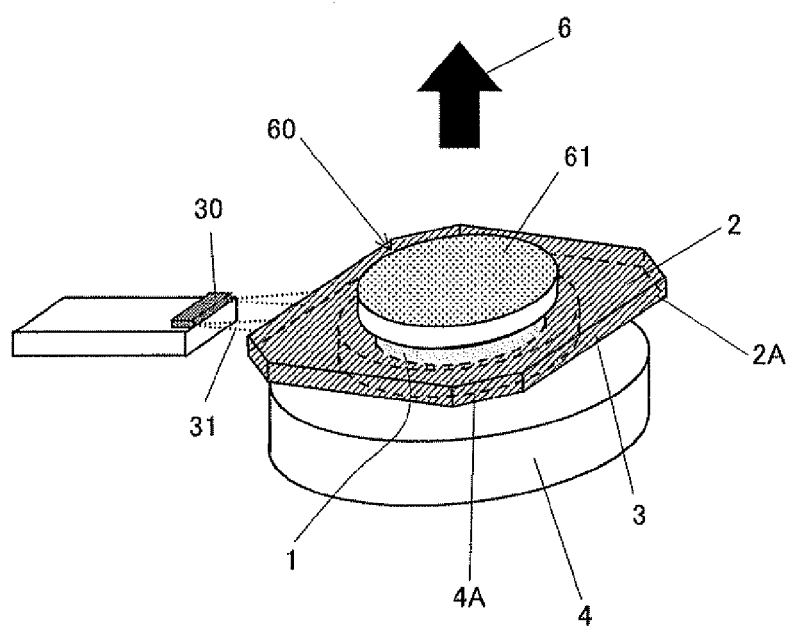
FIG. 10 shows a perspective view of the semiconductor laser pumped solid-state laser device according to a fifth embodiment of the present invention.
Figure 11:
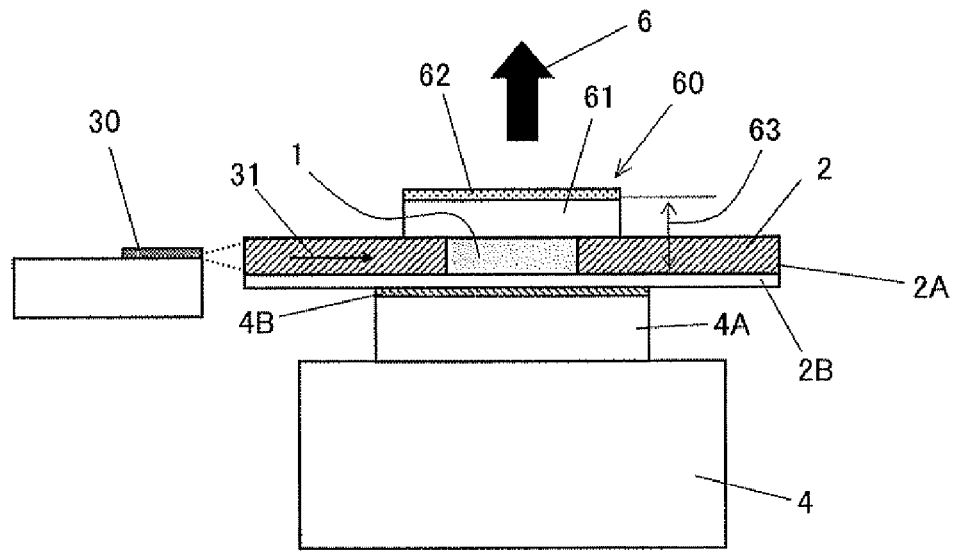
FIG. 11 shows a sectional view of the semiconductor laser pumped solid-state laser device according to the fifth embodiment of the present invention.

FIG. 10 shows a perspective view of the semiconductor laser pumped solid-state laser device according to a fifth embodiment of the present invention, and FIG. 11 shows a sectional view thereof.

As shown in these figures, the upper highly heat conductive section 4A having a narrower area than that of the heat sink 4 is formed on the heat sink 4, and a highly heat conductive bonding layer 4B is formed on the upper highly heat conductive section 4A. The solid-state laser core 1 formed of Nd:YAG has the light guide region 2 formed of Sm:YAG on its periphery, and the highly heat conductive bonding layer 4B is in direct contact with the total reflection film 2B for the laser wavelength formed on the bottom face of the solid-state laser core 1 and the light guide region 2. An optical modulator 60 is directly mounted on the upper face of the solid-state laser core 1 and the surrounding light guide region 2 opposite to the face contacting the heat sink 4. The optical modulator 60 is configured of a passive optical switch medium 61 formed of Cr:YAG, and a 50% partial reflection film 62 for the laser wavelength formed on the face of the passive optical switch medium 61 opposite to the face contacting the solid-state laser core 1. Here, reference numeral 63 denotes a laser resonator length.

According to the fifth embodiment, the laser output beam is obtained in the vertical direction by pumping the solid-state laser core 1 using the pumping semiconductor laser 30 disposed on the lateral side of the solid-state laser core 1, so that the optical modulator 60 can be mounted compactly on the solid-state laser core 1. In addition, by forming the partial reflection film for the laser oscillation wavelength on one face of the optical modulator 60, the output mirror can be configured integrally, which contributes to further miniaturization.

Moreover, the solid-state laser core 1, the surrounding light guide region 2, and the passive optical switch medium 60 are formed of the same base material, YAG, they can solidly adhere to each other by diffusion (thermo compression) bonding, for example, without the need of an adhesive. Thus, extraction of high-power laser beams does not tend to cause the decrease in performance of the solid-state laser device caused by the degradation of the adhesive.

In addition, since the laser resonator length 63 can be made as very short as 5 mm or less, the width of a generated laser pulse can be as short as 1 ns or less, which enables generation of the laser beam output 6 with high peak intensity suitable for processing of various materials.

Figure 12:
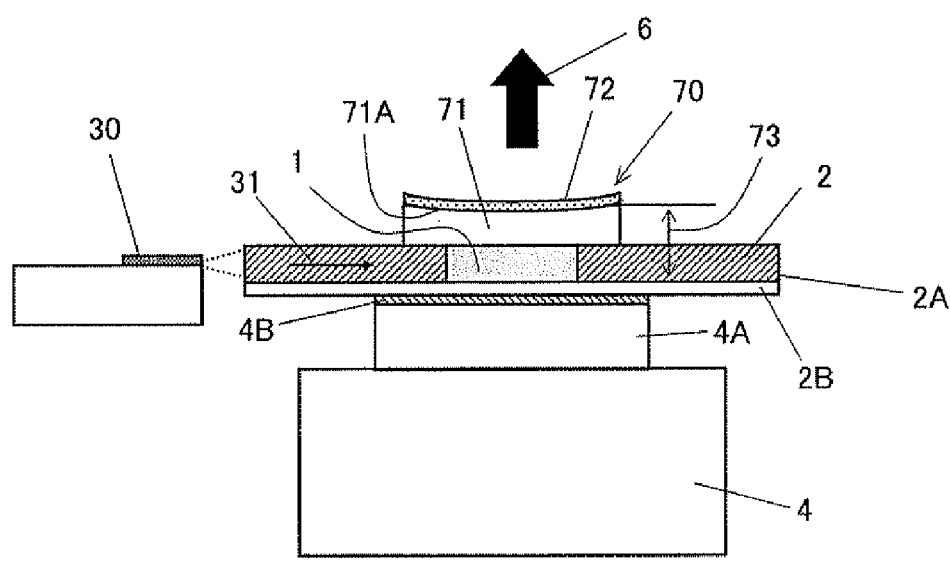
FIG. 12 shows a sectional view of the semiconductor laser pumped solid-state laser device according to a sixth embodiment of the present invention.

FIG. 12 shows a sectional view of the semiconductor laser pumped solid-state laser device according to a sixth embodiment of the present invention.

In this embodiment, an optical modulator 70 is mounted on the solid-state laser core 1 and the surrounding light guide region 2. The optical modulator 70 includes a concave face 71A made by processing the surface of a passive optical switch medium 71 formed of Cr:YAG opposite to the face contacting the solid-state laser core 1, and a 50% partial reflection film 72 formed thereon. Reference numeral 73 denotes a laser resonator length.

This embodiment has an advantage that, in addition to the effect according to the fifth embodiment described above, the central portion of the solid-state laser core 1 where the passive optical switch medium 71 formed of Cr:YAG is thinnest exhibits the lowest absorption loss of the laser beam, so that the oscillation occurs preferentially at the central portion and a laser mode to be obtained tends to be single-lobe-shaped about the solid-state laser core 1.

Figure 13:
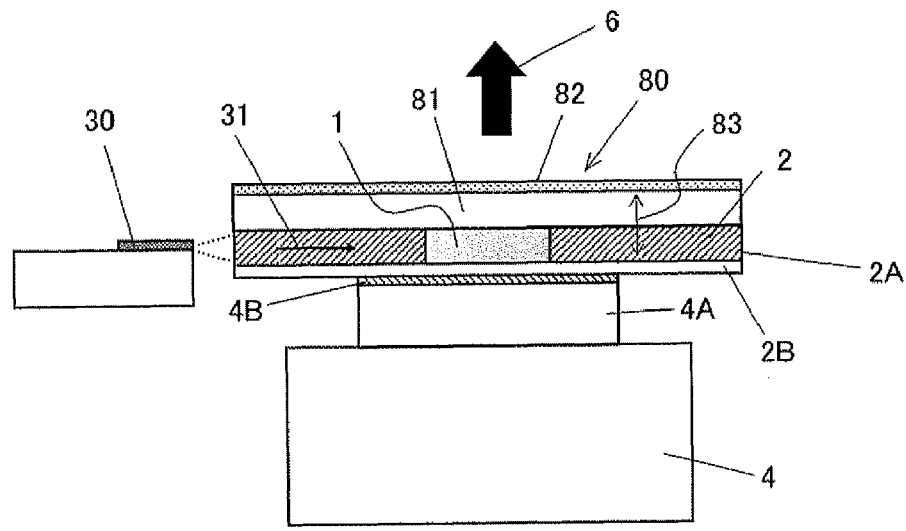
FIG. 13 shows a sectional view of the semiconductor laser pumped solid-state laser device according to a seventh embodiment of the present invention.

FIG. 13 shows a sectional view of the semiconductor laser pumped solid-state laser device according to a seventh embodiment of the present invention.

In this embodiment, an optical modulator 80 is disposed to cover the overall upper face of the solid-state laser core 1 and the surrounding light guide region 2. That is, the optical modulator 80 is configured of a passive optical switch medium 81 formed of Cr:YAG extended to the same area as that of the solid-state laser core 1 and the light guide region 2, and a 50% partial reflection film 82 for the laser beam wavelength formed uniformly on the face opposite to the face contacting the solid-state laser core 1. Reference numeral 83 denotes a laser resonator length.

This embodiment has an advantage that, in addition to the effect according to the fifth embodiment described above, the adhered optical modulator 80 as well as the upper and lower faces of the microchip configured of the solid-state laser core 1 and the light guide region 2 are perfectly planar without irregularity, so that formation and processing of the materials, coating with the dielectric film, and assembly of the elements can be readily performed in single procedure, which is suitable for large-scale, mass production, and the parallel faces configuring the solid-state laser resonator can be processed more accurately and thus the performance of the laser can also be improved.

Figure 14:
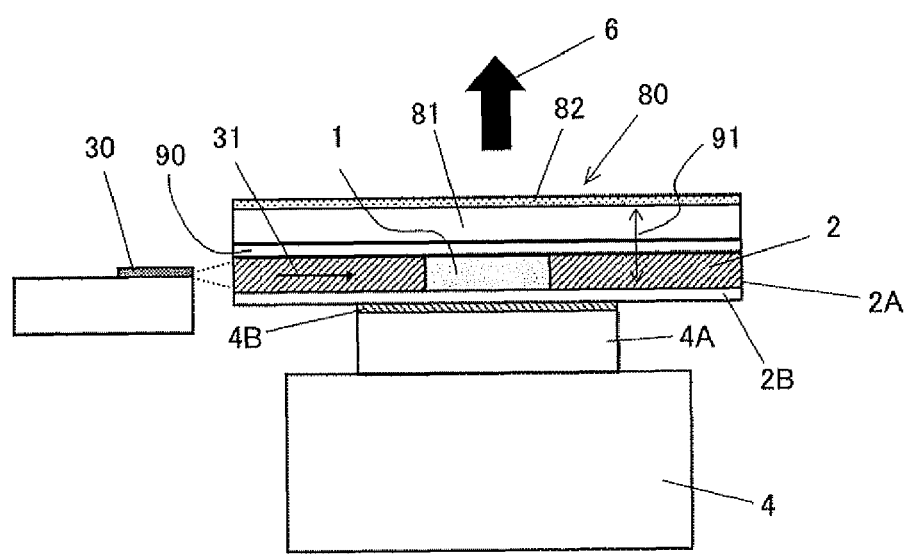
FIG. 14 shows a sectional view of the semiconductor laser pumped solid-state laser device according to an eighth embodiment of the present invention.

FIG. 14 shows a sectional view of the semiconductor laser pumped solid-state laser device according to an eighth embodiment of the present invention.

In this embodiment, a dielectric layer 90 formed of $SiO_2$ or $Al_2O_3$ is disposed between the upper face of the solid-state laser core 1 and the light guide region 2 opposite to the face contacting the heat sink 4 and the bottom face of the passive optical switch medium 81 formed of Cr:YAG facing the solid-state laser core 1. The dielectric layer 90 is disposed for preventing the pumping light 31 from leaking into the passive optical switch medium 81 by total-reflecting the pumping light 31 at the interface when the pumping light 31 from the pumping semiconductor laser 30 propagates through the light guide region 2. Reference numeral 91 denotes a laser resonator length.

According to this embodiment, since the pumping light 31 from the pumping semiconductor laser 30 does not leak at all into the passive optical switch medium 81 formed of Cr:YAG, the passive optical switch medium 81 does not generate heat nor change its transmittance by absorbing the pumping light 31, allowing the laser output beam to be obtained efficiently.

In the embodiments described above, the base material of the solid-state laser core 1 or the light guide region 2 may include $YVO_4$ (yttrium vanadate), $GdVO_4$ (gadolinium vanadate), YLF (yttrium lithium fluoride), and GGG (gadolinium gallium garnet), instead of YAG. In addition, the material may be a crystal structure or translucent ceramic. The pumping light wavelength may be that is absorbed by the laser oscillation element, Nd, but is not absorbed by Sm in the light guide region, and a range between 750 and 900 nm is suitable.

Although the base material of the cylindrical solid-state laser core 1 may be different from that of the light guide region 2, using the same base material is desirable because the refractive indexes become similar to each other and thus the optical loss at the interface can be suppressed. The solid-state laser core 1 and the light guide region 2 are preferably integrated in the course of production for easier handling and suppression of the optical loss at the interface.

A method of adhering the solid-state laser core 1 and the heat sink 4 may be by the use of an organic or non-organic adhesive therebetween or the use of a metal solder material such as Au, Ag, Sn, Sb, In, Pb, Zn, and Cu therebetween.

The heat sink 4 and the upper highly heat conductive section 4A may be formed of metal materials such as Cu and CuW, as well as non-metal or composite materials such as diamond, SiC, AlN, BeO, CBN, and DLC.

The optical modulator 40 may be formed of Cr:YAG as in the fourth embodiment, as well as other saturable absorbent materials such as V:YAG, a semiconductor, or semiconductor layers. The transmittance of the absorber is optimized depending on the pumping energy or required pulse energy of the semiconductor laser. As the optical modulator 40, KTP, LBO, or $LiNbO_3$ as a non-linear wavelength conversion element may also be used. In this case, the wavelength of the laser beam is converted in the optical modulator of the solid-state laser device before output.

The present invention should not be limited to the embodiments described above, and a number of variations are possible on the basis of the concept of the present invention. These variations should not be excluded from the scope of the present invention.

Industrial Applicability

The semiconductor laser pumped solid-state laser device according to the present invention can be utilized as a compact, high-power, highly efficient, and highly stable laser device needed for thermal/optical processing of various materials, displays, analyzing light sources, and laser ignition devices, where the compactness and high power are required.

What is claimed is:

1. A semiconductor laser pumped solid-state laser device, comprising;
    a solid-state laser core having opposing upper and lower surfaces and a peripheral surface between the upper and lower surfaces and formed of a laser medium containing neodymium (Nd) as a laser oscillation element;
    a light guide region integrally formed with the solid-state laser core, surrounding the peripheral surface of the solid-state laser core, the light guide region having an approximately rectangular shape with four linear light entrance windows formed in an outer peripheral surface thereof, and containing samarium (Sm), the light guide region being transmissive to a pumping light and absorbing a parasitic oscillation light from the solid-state laser core; and
    a heat sink on which the light guide region and the solid-state core are mounted, wherein laser oscillation is performed by introducing the pumping light through a light entrance window and propagating the pumping light through the light guide region to pump the solid-state laser core, and
    wherein a laser oscillation light is extracted from the upper surface of the solid-state laser core.

2. The semiconductor laser pumped solid-state laser device according to claim 1, wherein a wavelength of the pumping light is between 750 and 900 nm.

3. The semiconductor laser pumped solid-state laser device according to claim 1, wherein a base material of the solid-state laser core and the light guide region is YAG.

4. The semiconductor laser pumped solid-state laser device according to claim 1, wherein the pumping light is emitted from a pumping semiconductor laser, passes through a microlens for collimating the fast axis direction of the light from the pumping semiconductor laser, a first condenser lens for focusing the light in the slow axis direction, and a second condenser lens for focusing the light in the fast axis direction to enter the light entrance window of the light guide region.

5. The semiconductor laser pumped solid-state laser device according to claim 1, wherein the pumping light is emitted from a plurality of pumping semiconductor lasers stacked in the vertical direction, passes through a plurality of microlenses stacked in the vertical direction for collimating the fast axis direction of the emitted light from the pumping semiconductor lasers, a first condenser lens for focusing the light in the slow axis direction, and a second condenser lens for focusing the light in the fast axis direction to enter the light entrance window of the light guide region.

6. The semiconductor laser pumped solid-state laser device according to claim 1, wherein the pumping semiconductor laser is disposed adjacent to the light entrance window and the pumping light is directly introduced into the light guide region.

7. The semiconductor laser pumped solid-state laser device according to claim 1, wherein an optical modulator is directly mounted on the solid-state laser core and the light guide region.

8. The semiconductor laser pumped solid-state laser device according to claim 7, wherein the optical modulator is an optical modulator formed of a saturable absorber Cr:YAG.

9. The semiconductor laser pumped solid-state laser device according to claim 8, wherein a total reflection film for a laser beam wavelength is formed on the bottom surface of the solid-state laser core and the light guide region, and a partial reflection film for the laser beam wavelength is formed on a surface of the optical modulator.

10. The semiconductor laser pumped solid-state laser device according to claim 8, wherein the surface of the upper face of the optical modulator has a concave shape.

11. The semiconductor laser pumped solid-state laser device according to claim 8, wherein the area of the optical modulator is extended to the same area as that of the solid-state laser core and the light guide region.

12. The semiconductor laser pumped solid-state laser device according to claim 8, wherein a dielectric layer formed of $SiO_2$ or $Al_2O_3$ is provided between (1) the solid-state laser core and the light guide region and (2) the optical modulator.

* * * * *